Jan. 22, 1963   B. NOBBE   3,074,324
PAPERMAKING MACHINE
Filed April 25, 1960
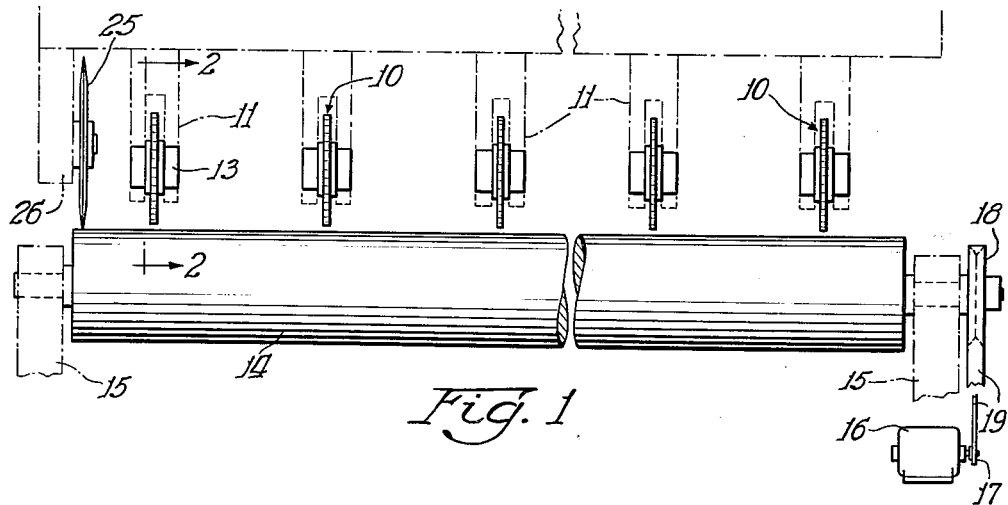
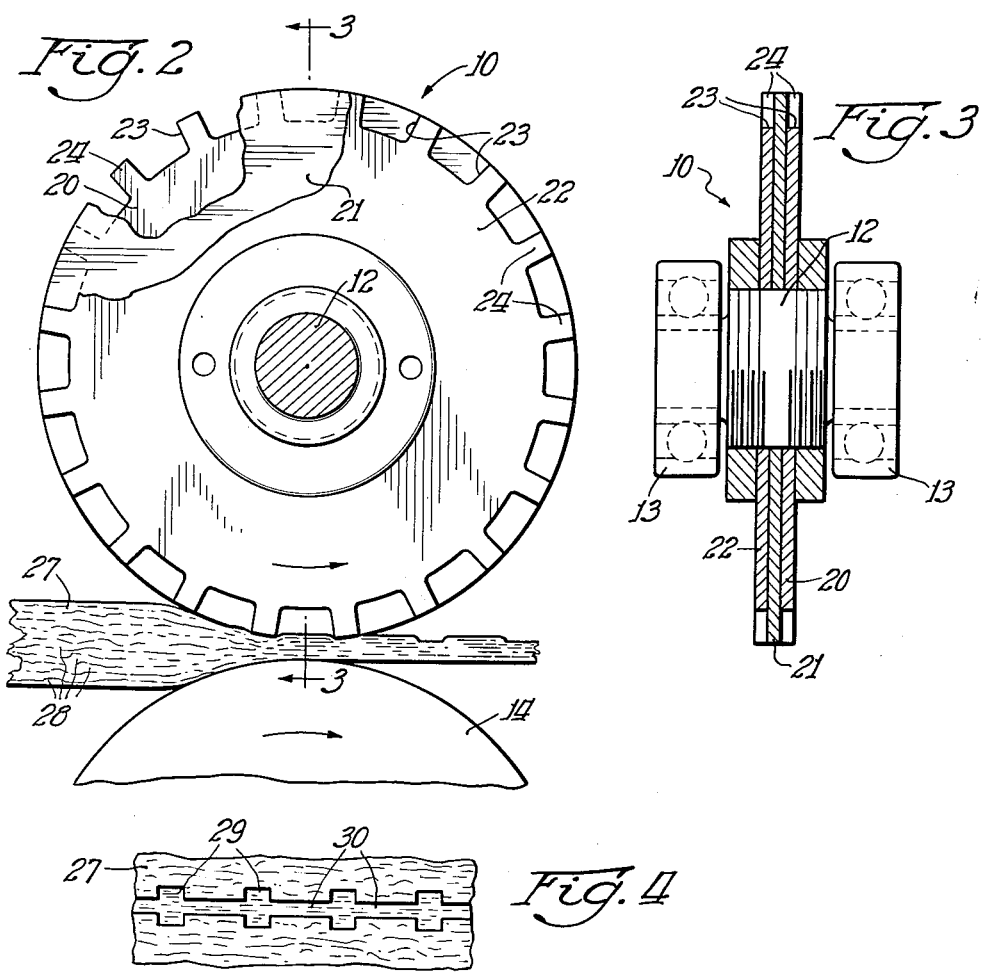

United States Patent Office 3,074,324
Patented Jan. 22, 1963

3,074,324
PAPERMAKING MACHINE
Bernard Nobbe, Neenah, Wis., assignor to Kimberly-Clark Corporation, Neenah, Wis., a corporation of Delaware
Filed Apr. 25, 1960, Ser. No. 24,584
1 Claim. (Cl. 93—1.1)

My invention relates to papermaking machinery and, more particularly, to embossing mechanisms for fixing together plies of paper or creped wadding which, due to its high bulk, is particularly suitable for packing purposes.

It has previously been proposed to provide a plurality of spaced, rotatably mounted, uniform thickness embossing discs or wheels opposite a driven roll operable to emboss such materials by running the material between the roll and discs. Difficulties have been had with such uniform thickness embossing wheels, however, in driving the wheels, since the wheels on their peripheries were smooth. For this reason and others, the material was stretched along the lines of embossing, causing hills and valleys along these lines, so that the end product was not flat and smooth. Such uniform thickness embossing wheels also tended to cut the material under the high embossing pressures necessary for effective embossing; and this, of course, was undesirable for a continuous unitary product.

It was also proposed that wheels be used each having a central peripheral groove with outer protruding rim portions on the sides of the groove actually being effective to do the embossing. This form of embossing wheel, however, also had its drawbacks. Such a wheel tended to cock, so that it embossed to a greater extent on one side than on the other; and this was particularly true if the embossed material was impregnated with some binder, such as asphalt, which collected on one or the other of the rim portions. This form of embossing wheel also tended to cut through the material and unduly reduced the bulk of the material, rendering it less effective for packing purposes for which high bulk is desirable. Also, the plies did not adhere to each other very well with this type of wheel.

It is an object of the present invention to provide an improved embossing wheel that will firmly bond the plies together and which will produce an embossed stack of plies that is relatively flat and smooth.

Briefly, my improved embossing wheel, in a preferred form, comprises a central disc portion and two side serrated disc portions in contact with the central portion.

The invention consists of the novel constructions, arrangements and devices to be hereinafter described and claimed for carrying out the above stated objects and such other objects as will be apparent from the following description of a preferred form of the invention, illustrated with reference to the accompanying drawing wherein:

FIG. 1 is an elevational view of a plurality of embossing wheels, embodying the principles of the invention, located opposite a drive roll;

FIG. 2 is an elevational view of one of the embossing wheels located opposite the drive roll and showing the work material being embossed, the view being taken on line 2—2 of FIG. 1;

FIG. 3 is a sectional view taken on line 3—3 of FIG. 2; and

FIG. 4 is a fragmentary plan view of some of the work material after embossing.

Like characters of reference designate like parts in the several views.

The illustrated embossing apparatus comprises a plurality of coaxially disposed embossing wheels 10, each of which is rotatably mounted with respect to fixed supporting structure, such as a pair of stationary arms 11. A shaft 12 extends through each of the wheels 10 and into bearings 13 which are counter sunk into the arms 11.

A roll 14 is rotatably mounted in a frame 15 so that the roll axis lies parallel to the axes of the embossing wheels 10. The roll 14 is driven by any suitable mechanism, such as by a motor 16 that is connected by means of pulleys 17 and 18 and a belt 19 with the roll 14.

Each of the embossing wheels 10 is made up of three sheet metal discs 20, 21 and 22 of uniform diameter. The central disc 21 is continuous in its periphery, and the side discs 20 and 22 are provided with notches 23 on their peripheries forming equally spaced bosses or teeth 24 on the peripheries. The notches 23 and teeth 24 of the two discs 20 and 22 are preferably aligned, but they can also be out of line, if desired.

The embossing wheels 10 may be of many different sizes, but a size that has been found to be very satisfactory is one of about 4¼" in diameter. With this size wheel, the teeth 24 were 3⁄16" thick; the notches 23 had a depth of one-quarter inch; and there were 20 teeth 24 around the periphery of each of the discs 20 and 22. The discs 20, 21, and 22 preferably are formed of sheet metal but may, of course, be made of other materials, if desired. The discs may be of various thicknesses; but in actual usage, discs of 3⁄32" to 1⁄8" have been found to be very satisfactory. The wheels 10 may be spaced apart any desired distance; such as from 4" to 40", depending on the degree of embossing it is desired to give the material worked on.

In the event that it is desired to slit the material being worked on at the same time that the material is embossed, a slitter wheel 25 rotatably mounted on a stationary arm 26 may be provided.

The material 27, to be embossed, comprises a plurality of plies 28. The material 27 may, for example, be creped wadding or paper which may be relatively clean or which may contain a certain amount of binding material, such as asphalt. The number of plies is quite variable—the illustrated embossing apparatus has been found to work very satisfactorily with 10 to 30 plies, for example. A sheet of relatively thick backing paper may be provided for the external plies or not, as desired.

The material 27 passes between the roll 14 and the embossing wheels 10 and is compressed therebetween as the roll 14 is driven. The teeth 24 on the edges of the wheels 10 intermesh to some extent with the wadding and assure that the wheels 10 revolve along with the wadding. There is substantial pressure put on the wheels 10; and they leave a characteristic impression on the wadding comprising a plurality of consecutive, relatively wide, depressions 29 connected by relatively narrow depressions 30. The plies of material, in being pressed together, adhere to each other subsequent to passage between the wheels 10 and roll 14, so that a unitary product comprising the plurality of plies is produced. Since the embossing wheels 10 are substantially spaced from each other, the creped wadding has substantial thickness between the embossed depressions; so that the wadding, as a product, has substantial bulk and is very suitable for packaging, for example.

Due to the relatively wide depressions 29 formed by the embossing wheels 10, the wheels effectively bond the plies 28 to each other and do not act as slitters to actually cut the material. The slitter 25 may be used adjacent a line of embossing in the material 27; and, in this case, in particular, it is important to have such effective bonding between the plies. The wheels 10, in effect, provide line embossing, but due to the notches 23 in the end discs 20 and 22, there is no substantial expansion of the material as a whole along the lines of embossing which would cause hills and valleys in the material, and the finished product is relatively flat and smooth. This is apparently due to the fact that there is a certain amount of crimping of the material 27 between the wide portions 29 of the embossed pattern lengthwise of the material and also the fact that the embossing wheels 10, in effect, have teeth engaging the material 27 so that there is no substantial slippage between the wheels and material to cause a pulling and stretching of the material lengthwise as it passes under the wheels.

I wish it to be understood that the invention is not to be limited to the specific constructions and arrangements shown and described, except only insofar as the claim may be so limited, as it will be understood to those skilled in the art that changes may be made without departing from the principles of the invention.

I claim:

An embossing wheel for fixing together plies of creped paper by impressing the paper between it and a non-yielding support, comprising a first disc of sheet material having a continuous cylindrical work embossing periphery and a pair of discs of sheet material on opposite sides of said first disc and in face to face contact with said first disc, said pair of discs having cylindrical work embossing peripheral portions of the same diameter as said first disc and separated from each other by a plurality of equally spaced notches which are cut into the peripheries of said pair of discs and each of which is circumferentially longer than said work embossing peripheral portions.

References Cited in the file of this patent
UNITED STATES PATENTS

| | | |
|---|---|---|
| 106,963 | Rogers | Aug. 30, 1870 |
| 352,993 | Howard | Nov. 23, 1886 |
| 1,298,882 | Bull | Apr. 1, 1919 |
| 1,734,297 | Kitchen | Nov. 5, 1929 |
| 1,819,375 | Matthews | Aug. 18, 1931 |
| 1,964,700 | Winter et al. | June 26, 1934 |
| 2,014,460 | Alm | Sept. 17, 1935 |
| 2,106,246 | Fourness | Jan. 25, 1938 |
| 2,284,254 | Batcheller | May 26, 1942 |